United States Patent
Algreatly

(10) Patent No.: US 9,117,104 B2
(45) Date of Patent: Aug. 25, 2015

(54) OBJECT RECOGNITION FOR 3D MODELS AND 2D DRAWINGS

(71) Applicant: Cherif Atia Algreatly, Palo Alto, CA (US)

(72) Inventor: Cherif Atia Algreatly, Palo Alto, CA (US)

(73) Assignee: Cherif Algreatly, Fremont, CA (US)

( * ) Notice: Subject to any disclaimer, the term of this patent is extended or adjusted under 35 U.S.C. 154(b) by 234 days.

(21) Appl. No.: 13/938,301

(22) Filed: Jul. 10, 2013

(65) Prior Publication Data

US 2015/0016667 A1    Jan. 15, 2015

(51) Int. Cl.
*G06K 9/00* (2006.01)
*G06K 9/64* (2006.01)

(52) U.S. Cl.
CPC .................................. *G06K 9/00201* (2013.01)

(58) Field of Classification Search
USPC ......................................... 382/128, 154, 305
See application file for complete search history.

(56) References Cited

U.S. PATENT DOCUMENTS

| | | | | |
|---|---|---|---|---|
| 6,151,404 | A * | 11/2000 | Pieper | 382/128 |
| 7,764,817 | B2 * | 7/2010 | Georgescu et al. | 382/128 |
| 8,311,306 | B2 * | 11/2012 | Pavlovskaia et al. | 382/131 |
| 8,953,858 | B2 * | 2/2015 | Becker et al. | 382/128 |
| 2004/0193093 | A1 * | 9/2004 | Desmond, III | 604/8 |
| 2005/0149360 | A1 * | 7/2005 | Galperin | 705/2 |
| 2007/0014451 | A1 * | 1/2007 | Dwyer et al. | 382/128 |
| 2011/0206247 | A1 * | 8/2011 | Dachille et al. | 382/128 |

* cited by examiner

*Primary Examiner* — Ishrat I Sherali

(57) ABSTRACT

A first method is disclosed for recognizing 3D objects in 3D models created by 3D scanners, depth sensing cameras or created by a 3D modeling software application. A second method is disclosed for recognizing 2D objects in drawings. The 3D/2D objects can be individual objects that have simple forms or combined objects that are comprised of a plurality of individual objects that are attached to each other in a certain manner to form one entity. The first and second methods serve a variety of medical, engineering, industrial, gaming and augmented reality applications.

19 Claims, 17 Drawing Sheets

| ID | Pattern | | |
|---|---|---|---|
| | Axis | Shapes | Areas |
| Sphere | Vertical Line | Circles | Converted V |
| Cylinder | Vertical Line | Circles | Horizontal Line |
| Pyramid | Vertical Line | Polygon | Sloped Line |
| Semi-Torus | Converted Y | Circles & Ellipses | Converted V |

| Section # | Axis Angle | Section Shape | Section Area |
|---|---|---|---|
| 1 | 90 | Circle | X |
| 2 | 90 | Circle | 3X |
| 3 | 90 | Circle | 7X |
| 4 | 90 | Circle | 3X |
| 5 | end | Circle | X |

| Pattern | | |
|---|---|---|
| Axis | Shapes | Areas |
| Vertical Line | Circles | Converted V |

| ID | Pattern | | |
|---|---|---|---|
| | Axis | Shapes | Areas |
| Sphere | Vertical Line | Circles | Converted V |
| Cylinder | Vertical Line | Circles | Horizontal Line |
| Pyramid | Vertical Line | Polygon | Sloped Line |
| Semi-Torus | Converted Y | Circles & Ellipses | Converted V |

| Section # | Axis Angle | Section Shape | Section Area |
|---|---|---|---|
| 1 | 90 | Circle | X |
| 2 | 90 | Circle | X |
| 3 | 90 | Circle | X |
| 4 | end | Circle | X |

| Pattern | | |
|---|---|---|
| Axis | Shapes | Areas |
| Vertical Line | Circles | Horizontal Line |

| Section # | Axis Angle | Section Shape | Section Area |
|---|---|---|---|
| 1 | 120, 60 | Circle | X |
| 2 | 135, 45 | Circle | X |
| 3 | 150, 30 | Circle | X |
| 4 | 90 | Circle | X |
| 5 | end | Circle | X |

| Pattern | | |
|---|---|---|
| Axis | Shapes | Areas |
| Converted Y | Circles & Ellipses | Converted V |

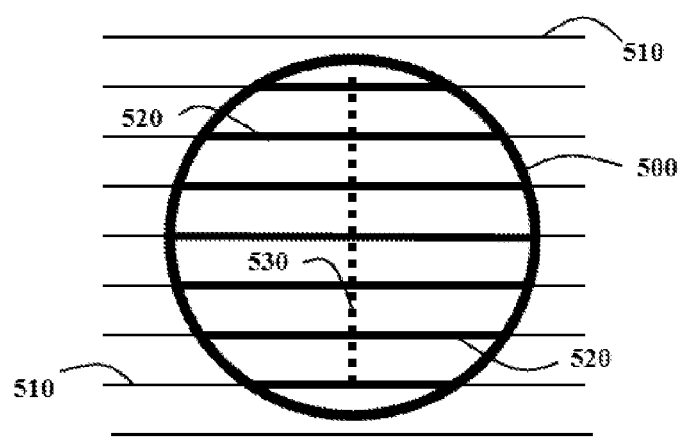
FIG. 16
| Pattern | | |
|---|---|---|
| Axis | Intersectional Lines | Lengths |
| Vertical Line | Line | Converted V |
FIG. 17
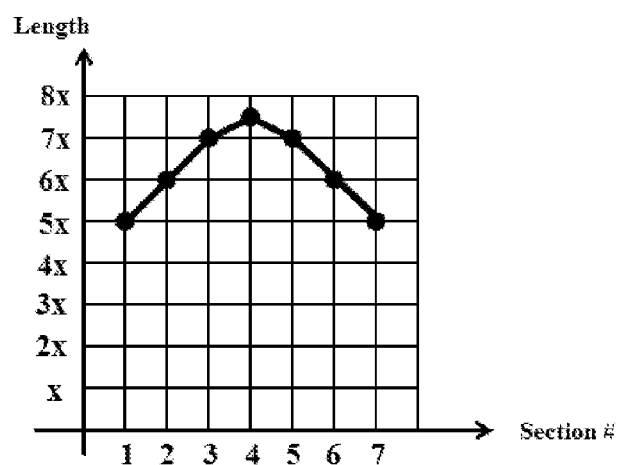
FIG. 18

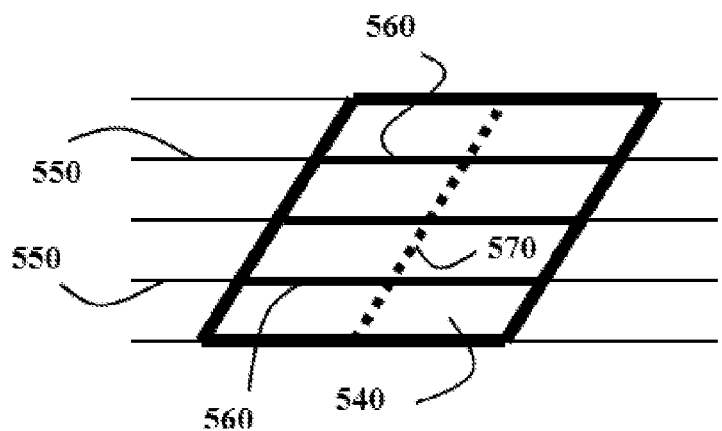
FIG. 19
| Pattern | | |
|---|---|---|
| Axis | Intersectional Lines | Lengths |
| Sloped Line | Line | Horizontal Line |
FIG. 20
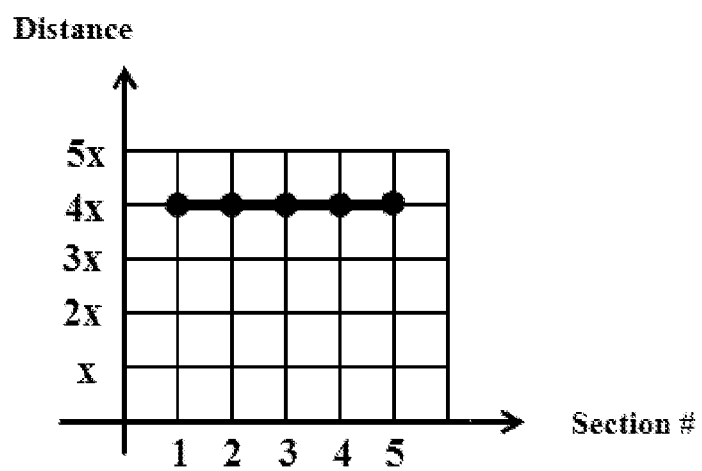
FIG. 21

| ID | Pattern | | |
|---|---|---|---|
| | Axis | Intersectional Lines | Lengths |
| Circle | Vertical Line | Line | Converted V |
| Parallelogram | Sloped Line | Line | Horizontal Line |
| Rectangle | Vertical Line | Line | Vertical Line |
| Isosceles Triangle | Vertical Line | Line | Sloped Line |
| Right Triangle | Sloped Line | Line | Sloped Line |
FIG. 22
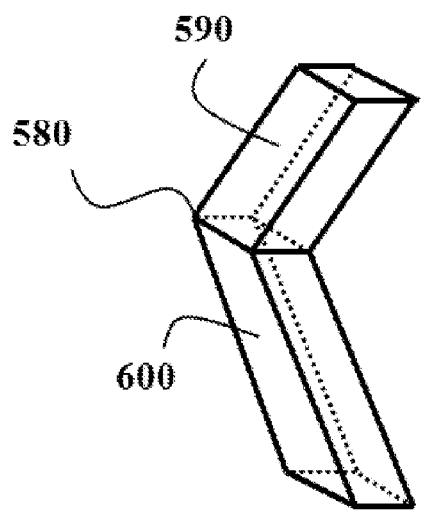
FIG. 23
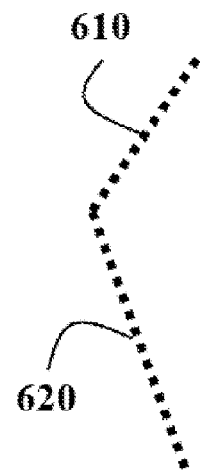
FIG. 24

| ID | Pattern | | |
|---|---|---|---|
| | Axis | Shapes | Areas |
| Leg | Line | Polygon | Any |

| Number of Individuals 3D Objects of a Table Leg | Type of attachment |
|---|---|
| One or more | Vertical |

| | | LAYER # | | |
|---|---|---|---|---|
| | | 1 | | |
| | | A | B | C |
| LAYER # | A | | H | |
| 1 | B | H | | H |
| | C | | H | |

| ID | Pattern | | |
|---|---|---|---|
| | Axis | Shapes | Areas |
| Horizontal Surface | Line | Polygon | Any |

| Number of Individual 3D Objects of a Table Leg | Type of attachment |
|---|---|
| One or more | Horizontal |

| Circle No. | Name |
|---|---|
| 1 | Head |
| 2 | Neck |
| 3 | Shoulder and Stomach |
| 4 | Arm |
| 5 | Forearm |
| 6 | Palm |
| 7 | Finger |
| 8 | Finger |
| 9 | Finger |
| 10 | Finger |
| 11 | Finger |
| 12 | Arm |
| 13 | Forearm |
| 14 | Palm |
| 5 | Finger |
| 16 | Finger |
| 17 | Finger |
| 18 | Finger |
| 19 | Finger |
| 20 | Thigh |
| 21 | Leg |
| 22 | Foot |
| 23 | Finger |
| 24 | Finger |
| 25 | Finger |
| 26 | Finger |
| 27 | Finger |
| 28 | Thigh |
| 29 | Leg |
| 30 | Foot |
| 31 | Finger |
| 32 | Finger |
| 33 | Finger |
| 34 | Finger |
FIG. 38
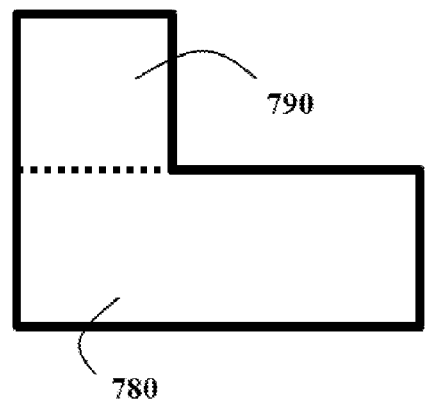
FIG. 39
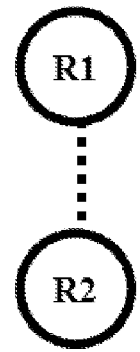
FIG. 40

_US 9,117,104 B2_

OBJECT RECOGNITION FOR 3D MODELS AND 2D DRAWINGS

BACKGROUND

Typical object recognition is the task of finding a given object in an image or video sequence. Humans recognize a multitude of objects in images with little effort, despite the fact that the image of the objects is seen from different points-of-view and varying levels of scale, size, and appearance.

Recently, with the spread of the three-dimensional (3D) scanners, the data collected about objects comes in the form of 3D models. For example, in architecture and construction, 3D scanners are directly used for measuring and visualizing buildings through the generation of a set of data points in a coordinate system known as a point cloud. In the medical field, the CT, MRI, or Micro-CT scanners produce a set of two-dimensional (2D) slices which are then stacked together to produce a 3D representation. In modern augmented reality and gaming fields, laser scanners are used in real-time to generate 3D models for real objects that are integrated somehow with a virtual environment presented on a wearable display or glasses connected to a computer.

In fact, there is a need for a universal method and a technique that enables the recognition of objects in 3D models to serve the current and future applications of various medical, engineering, industrial, gaming, and entertainment fields.

SUMMARY

The present invention discloses a method for recognizing objects in 3D models created by a 3D scanner or a depth sensing camera, or created by 3D modeling software applications or the like. Accordingly, in the medical field, it becomes possible to automatically analyze the medical situation of a patient based on the 3D scanning of his/her body or organs. In engineering, it becomes possible to automatically evaluate the inefficiency of an existing building against potential disasters such as earthquakes, hurricanes, or explosions based on the 3D scanning of the building. Also in augmented reality and gaming fields, it becomes possible to recognize the different objects of a surrounding environment around a user and automatically change the action or behavior of the virtual characters of the application according to the objects identity. In robotics field, it becomes possible to identify the objects that appear in front of a depth sensing camera or a 3D scanner of a robot and automatically manipulate the robot's response to a suitable performance or interaction towards these objects.

Generally, in one embodiment, the present invention discloses a method for recognizing an individual 3D object represented by a 3D model according to a vector graphics format. The method is comprised of: slicing the individual 3D object into sections with a plurality of planes creating a number of 2D shapes; determining the axis pattern that describes a path that defines a connection between the centers of the successive 2D shapes; determining the shape pattern that describes the 2D shapes; determining the area pattern that describes the area variations between the 2D shapes; checking the axis pattern, the shape pattern and the area pattern against a database that associates each unique combination of an axis pattern, shape pattern and an area pattern with a unique ID identifying a 3D object.

In another embodiment, the present invention discloses a method for recognizing an individual 2D object represented by a 2D drawing according to a vector graphics format. The method is comprised of: slicing the individual 2D object with a plurality of rays creating a number of intersectional lines; determining the axis pattern that describes a path connecting between the center points of the successive intersectional lines; determining the shape pattern that describes the intersectional lines; determining the length pattern that describes the length variations between the intersectional lines; checking the axis pattern, the shape pattern and the length pattern against a database that associates each unique combination of an axis pattern, a shape pattern and a length pattern with a unique ID identifying a 2D object.

A plurality of individual 3D objects can be attached to each other to form a combined 3D object that has an identity. To recognize the identity of a combined 3D object, each individual 3D object of the combined 3D object is identified, in addition to the attachment pattern between the individual 3D objects. A plurality of individual 2D objects can be attached to each other to form a combined 2D object that has an identity. To recognize the identity of a combined 2D object, each individual 2D object of the combined 2D object is identified, in addition to the attachment pattern between the individual 2D objects.

BRIEF DESCRIPTION OF THE DRAWINGS

FIG. 16 illustrates a circle sliced by parallel rays creating a number of intersectional lines.

FIG. 17 illustrates a table indicating the patterns that describe the intersectional lines of the circle.

FIG. 18 illustrates a graph representing the lengths of the intersectional lines relative to each other.

FIG. 19 illustrates a parallelogram sliced by parallel rays creating a number of intersectional lines.

FIG. 20 illustrates a table indicating the patterns that describe the intersectional lines of the parallelogram.

FIG. 21 illustrates a graph representing the lengths of the intersectional lines of the parallelogram relative to each other.

FIG. 22 illustrates an example of a first database defining the parameters of some individual 2D objects.

FIG. 23 illustrates a 3D model of a combined 3D object representing a leg of a table.

FIG. 24 illustrates a first axis and a second axis of the two individual 3D objects of the table leg.

FIG. 38 illustrates a table indicating the names of the parts of the human body.

FIG. 39 illustrates an example of a combined 2D object in the form of an L-shape divided into a first rectangle and a second rectangle.

FIG. 40 illustrates a bubble diagram representing the attachment between the first rectangle and the second rectangle of the L-shape.

DETAILED DESCRIPTION

The graphical representation of a vector graphics format can be categorized into 3D models or 2D drawings. The 3D model can be classified into individual 3D objects or combined 3D objects. The individual 3D objects are the 3D objects that are comprised of a simple form such as a sphere, cylinder, prism or pyramid. The combined 3D objects are the 3D objects that are comprised of a plurality of individual 3D objects attached to each other in a certain manner to form one entity. For example, a 3D model of a table comprised of four legs and a horizontal surface is an example of a combined 3D object, whereas each leg of the four legs, in addition to the horizontal surface, are examples of an individual 3D object. The 3D object may represent an entity comprised of a number of other entities. For example, in a 3D model of a human body, the human body is comprised of two arms, two legs, a head, neck, chest and the like, whereas each arm is comprised of a hand, wrist and the like and the hand is comprised of five fingers and one palm.

Also the 2D drawings can be classified into individual 2D objects or combined 2D objects. The individual 2D objects are the 2D objects that are comprised of a simple form such as a circle, rectangle, triangle or parallelogram. The combined 2D objects are the 2D objects that are comprised of a plurality of individual 2D objects attached to each other in a certain manner to form one entity. For example, a 2D drawing of a cube represented by two parallelograms and a rectangle attached to each other is an example of a combined 2D object, whereas each parallelogram, in addition to the rectangle, is an example of an individual 2D object. Also the 2D object may represent an entity comprised of a number of other entities. For example, in a 2D drawing of a human face, the face is comprised of two eyes, a nose, mouth and facial outline, while each of the two eyes, nose and mouth is comprised of a number of other entities.

Figure 1:
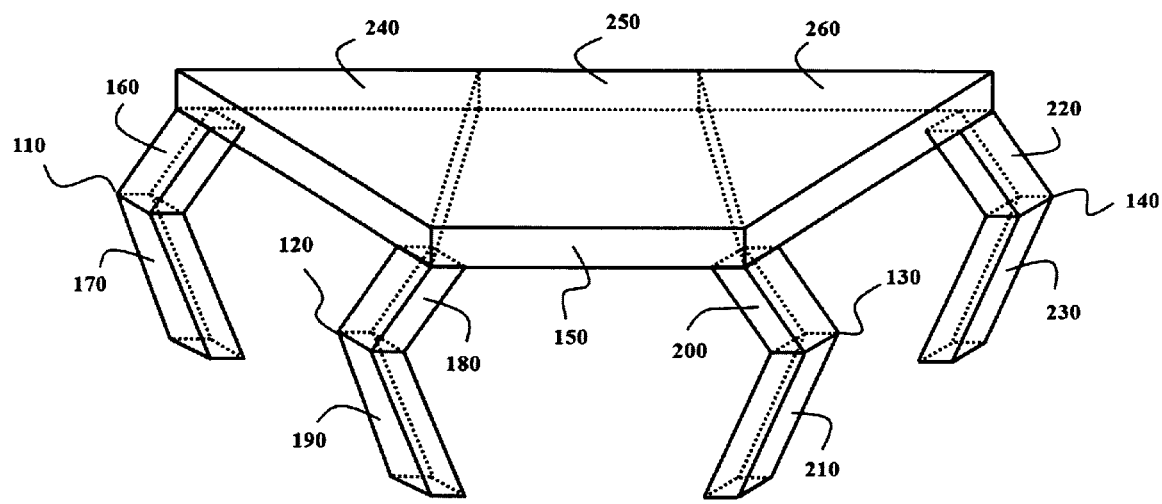
FIG. 1 illustrates a 3D model of a table comprised of four legs and a horizontal surface.

FIG. 1 illustrates a 3D model of a table comprised of a first leg 110, a second leg 120, a third leg 130, a fourth leg 140 and a horizontal surface 150. The first leg is comprised of a first prism 160 and a second prism 170. The second leg is comprised of a first prism 180 and a second prism 190. The third leg is comprised of a first prism 200 and a second prism 210. The fourth leg is comprised of a first prism 220 and a second prism 230. The horizontal surface is comprised of a first prism 240, a second prism 250, and a third prism 260. All prisms in the figure are triangular prisms except the second prism of the horizontal surface which is a square prism. According to the previous definition of the 3D objects, each one of the four legs is comprised of two individual 3D objects attached to each other. Also the horizontal surface is comprised of three individual 3D objects attached to each other. Each leg has the identity of a leg and the horizontal surface has the identity of a horizontal surface, while the table that includes the four legs and the horizontal surface has the identity of a table. Accordingly, the entity of the table is comprised of two other entities. To automatically recognize the identity of the table, it is required first to recognize the identity of its legs and horizontal surface. However, to recognize the identity of the legs and the horizontal surface, it is required to recognize the individual 3D objects that the legs and the horizontal surface are comprised of.

Figure 2:
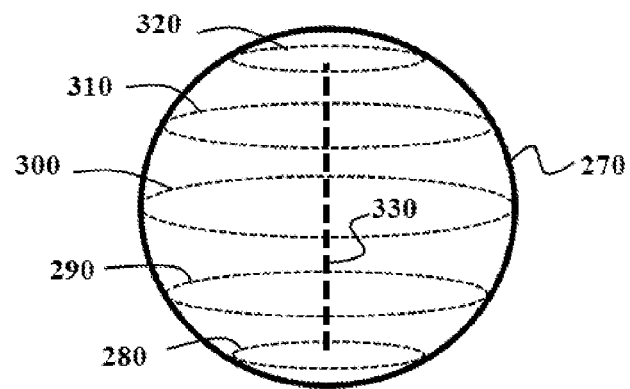
FIG. 2 illustrates a 3D model of a sphere sliced into five sections creating five circles.
Figure 3:
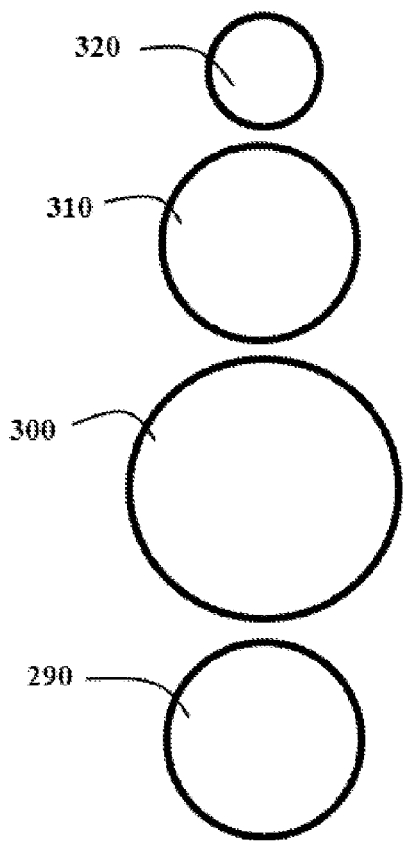
FIG. 3 illustrates the five circles created by slicing the 3D model of the sphere into five sections.
Figures 4, 5, 6:
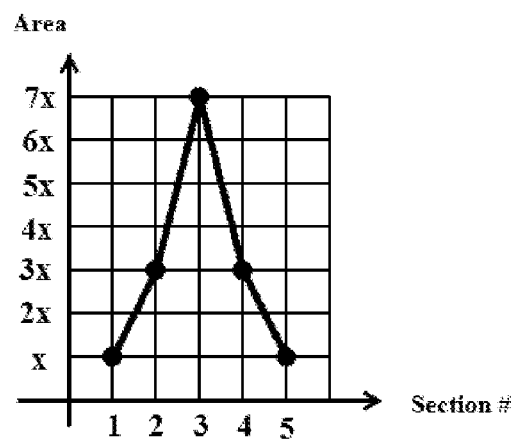
FIG. 4 illustrates a table indicating the parameters of the five circles relative to each other.
FIG. 5 illustrates a table indicating the patterns of the circles' parameters.
FIG. 6 illustrates a graph representing the areas of the circles relative to each other.

Generally, the present invention discloses a method for recognizing individual 3D objects. For example, FIG. 2 illustrates an example of an individual 3D model in the form of a sphere 270 sliced into sections with a plurality of planes creating five circles 280-320. Connecting between the centers of the circles create a path or axis 330 as shown in the drawing. FIG. 3 illustrates the areas or sizes of the five circles relative to each other. FIG. 4 illustrates a table indicating the axis angle at the center of each circle of a section, the section shape, and the area of each section of the 3D model of the sphere. As shown in the table are the relative areas of the first, second, third, fourth and fifth circles, respectively, x, 3x, 7x, 3x, and x.

Figures 7, 8:
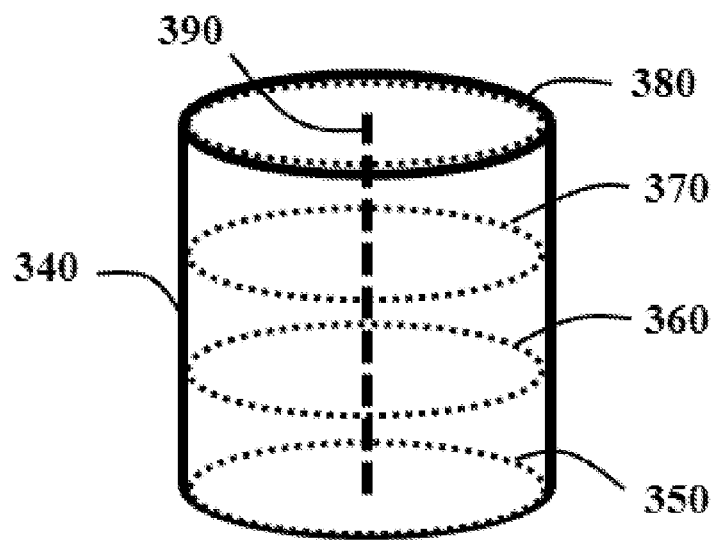
FIG. 7 illustrates an example of a first database defining the parameters of some individual 3D objects.
FIG. 8 illustrates a 3D model of a cylinder sliced into four sections forming four circles.

FIG. 5 illustrates another table indicating the axis pattern of the 3D model, the shape pattern of all sections and the area pattern of all sections. As shown in the table, the axis pattern is a vertical line as a result of the successive 90 degree angles in the table of FIG. 4. The shape pattern is circles whereas each section of the 3D model creates a circle. The area pattern is a "Converted V" which represents the figure of the English letter "V" but upside down, as illustrated in FIG. 6, which shows a graph indicating the areas of each circle of a section relative to each other. Comparing the axis pattern, the shape pattern and the area pattern with a first database that associates each unique combination of an axis pattern, a shape pattern and an area pattern with a unique ID or name enables identifying the 3D object of this example as a sphere. FIG. 7 illustrates an example of a first database that associates a unique ID or name for a sphere, cylinder and pyramid using the unique combination of the axis pattern, shape pattern and area pattern of each one of the individual 3D objects. As shown in the first database of FIG. 7, the 3D model of the previous example can be automatically identified as a sphere.

Figures 9, 10, 11:
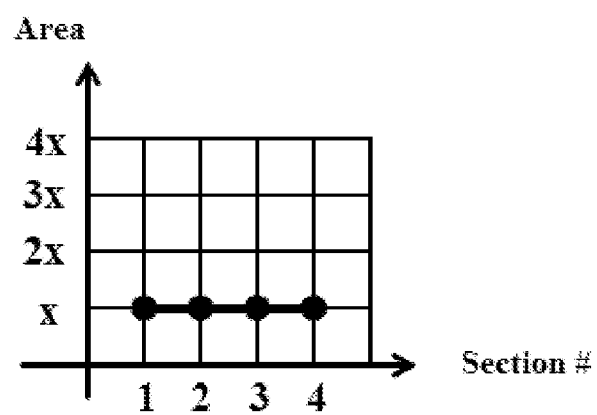
FIG. 9 illustrates a table indicating the parameters of the four circles of the cylinder relative to each other.
FIG. 10 illustrates a table indicating the patterns that describe the four circles of the cylinder.
FIG. 11 illustrates a graph representing the areas of the four circles of the cylinder relative to each other.

FIG. 8 illustrates another example of a 3D model representing an individual 3D object in the form of a cylinder 340 sliced into four sections with four planes creating four circles 350 to 380 that have equal areas. As shown in the figure, the axis 390 connects the four circles through their center points. FIG. 9 illustrates a table indicating the axis angle at the center of each circle of a section, the section shape and the section area of each section of the 3D model of the cylinder. FIG. 10 illustrates another table indicating the axis pattern of the 3D model of the cylinder, the shapes pattern of all sections, and the areas pattern of all sections. As shown in the table, the axis pattern is a vertical line as a result of the successive 90 degree angles in the table of FIG. 9. The shape pattern is that of a circle, whereas each section of the 3D model creates a circle. The area pattern is a horizontal line which describes the graph of FIG. 11 that illustrates the circles' areas relative to each other. Checking the table of FIG. 10 against the database of FIG. 7 enables recognizing the 3D model of this example as a cylinder.

Figures 12, 13:
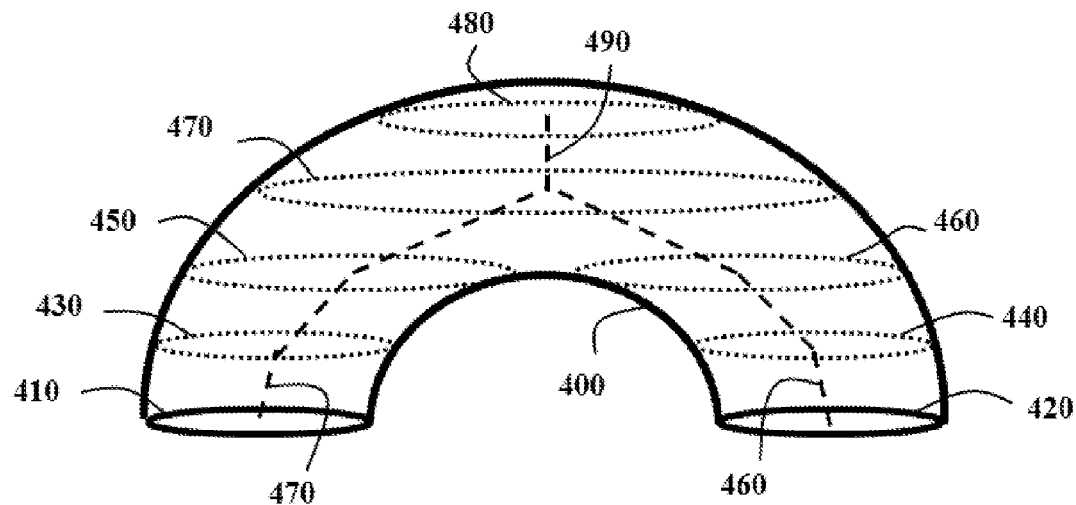
FIG. 12 illustrates a 3D model of a semi-torus sliced into five sections forming six circles and two ellipses.
FIG. 13 illustrates a table indicating the parameters of the six circles and the two ellipses relative to each other.
Figures 14, 15:
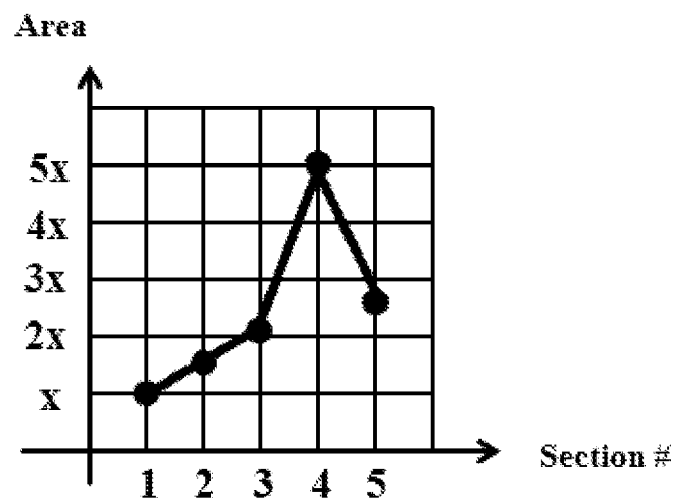
FIG. 14 illustrates a table indicating the patterns that describe the six circles and the two ellipses of the semi-torus.
FIG. 15 illustrates a graph representing the areas of the sections of the semi-torus relative to each other

FIG. 12 illustrates another example of an individual 3D model of a semi-torus 400 sliced into five sections by five parallel planes creating six circles 410-460 and two ellipses 470-480. As shown in the figure, each of the two circles 410-420, 430-440, and 450-460 are located on the same plane, while each of the two ellipses 470-480 are located on a separate plane. The axis 490 connects between the centers of each two successive circles or ellipses on two successive planes. FIG. 13 illustrates a table indicating the axis angle at the center of each circle or ellipse, the section shape and the section area of each section of the 3D model of the semi-torus. FIG. 14 illustrates a table indicating the axis pattern of the 3D model of the semi-torus, the shape pattern of all sections and the area pattern of the sections. As shown in the table, the axis pattern is a "Converted Y" whereas the axis in FIG. 12 looks like the English letter "Y" but upside down. The shape pattern is that of circles and ellipses where each section of the 3D model creates a circle or an ellipse. The area pattern is a "Converted V" according to the graph of FIG. 15, whereas the area values increase to a limit and then start to decrease. Generally, it is important to note in this graph that the area of each section that has two circles is represented by one area of one circle only, whereas the indication of the two circles in one section or plane is represented in the form of the "Converted Y" of the axis pattern. Checking the table of FIG. 14 against the database of FIG. 7 enables the recognition of the 3D model in this example as a semi-torus.

The previous examples present the process of recognizing individual 3D objects, however, during the step of slicing the 3D model into sections, some individual 2D objects are created. To automatically recognize these individual 2D objects, a similar technique to recognizing the individual 3D object is used. For example, FIG. 16 illustrates a circle 500 sliced with a plurality of parallel rays 510 where the intersection between each ray and the circle creates an intersectional line 520 that starts and ends at the circle's perimeter. Connecting between the middle of each two successive intersectional lines creates an axis 530. FIG. 17 illustrates a table indicating the pattern of the axis, the pattern of the intersectional lines and the pattern of the lengths of the intersectional lines. As shown in the table, the axis pattern is a vertical line, the intersectional line pattern is a line and the length pattern is a "Converted V". FIG. 18 illustrates a graph presenting the relationship between each intersectional line and its length where the shape of the "Converted V" appears in the graph.

FIG. 19 illustrates another example of an individual 2D object in the form of a parallelogram 540. As shown in the drawing, the parallelogram is sliced with a plurality of parallel rays 550 where the intersection between each cutting line and the parallelogram creates an intersectional line 560 that starts and ends at the parallelogram perimeter. Connecting between the middle of each two successive intersectional lines creates an axis 570. FIG. 20 illustrates a table indicating the axis pattern, the intersectional lines pattern and the length pattern of this process. As shown in the table, the axis pattern is a sloped line, the intersectional lines pattern is a line and the lengths pattern is a horizontal line. FIG. 21 illustrates a graph presenting the relationship between each intersectional line and its length where the horizontal line that represents the lengths pattern appears in the graph.

FIG. 22 illustrates an example of a first database that associates a unique name or ID for a circle, parallelogram, rectangle, isosceles triangle and right triangle. As shown in the figure, each one of the individual 2D objects is associated with a unique combination of an axis pattern, an intersectional lines pattern and a length pattern. According to this database, the circle of FIG. 16 is automatically recognized as a circle. Also the parallelogram of FIG. 19 is automatically recognized as a parallelogram. In a similar manner, a rectangle, an isosceles triangle, or a right triangle can be automatically recognized or identified using this database.

Figures 25, 26, 27, 28:
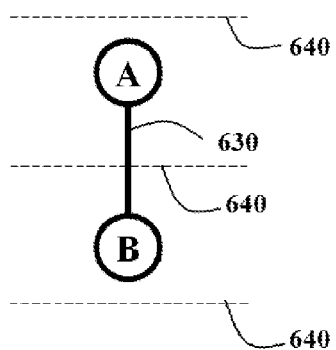
FIG. 25 illustrates a bubble diagram representing the attachment between the two individual 3D objects of the table leg.
FIG. 26 illustrates a table indicating the information of the bubble diagram of the table leg represented in a different format.
FIG. 27 illustrates a first database defining the identity of individual 3D objects.
FIG. 28 illustrates a second database defining the attachment between the individual 3D objects.

FIG. 23 illustrates a 3D model representing one of the four legs of a table of FIG. 1. As shown in the figure, the table leg 580 is comprised of a first prism 590 and a second prism 600. FIG. 24 illustrates the first axis of the first prism 610 and the second axis of the second prism 620. To automatically recognize this table leg in a 3D model, each prism is identified, in addition to the attachment relationship between the two prisms. Each prism can be simply identified using the technique described previously with the individual 3D objects. However, FIG. 25 illustrates a bubble diagram representing the relationship between the first prism, which is symbolized with circle "A" and the second prism, which is symbolized with circle "B". The connection line 630 that connects between the two circles is an indication for the attachment between the two prisms. The layer lines 640 separates the two circles in a first layer and a second layer where the level of the second layer is located above the first layer.

FIG. 26 illustrates a table representing the same information of the bubble diagram but in a different format. As shown in the table, there are two layers, where object "A" is located in the first layer and object "B" is located in the second layer. Objects "A" and "B" are vertically attached to each other as the English letter "V" in the table indicates. FIG. 27 illustrates a first database that identifies a table leg by describing the axis pattern, the shape pattern, and the area pattern of the 3D model of the table leg. As shown in the figure, the axis pattern is a "line", the shape pattern is a "polygon" and area pattern is "any" which means there is no specific condition for the areas pattern. FIG. 28 illustrates a second table indicating the possible number of individual 3D objects that are attached to each other to form a table leg, and the type of attachment between the individual 3D objects. Based on the first database and the second database of the previous two figures the 3D model of FIG. 23 is recognized as a table leg.

Figures 29, 30, 31, 32:
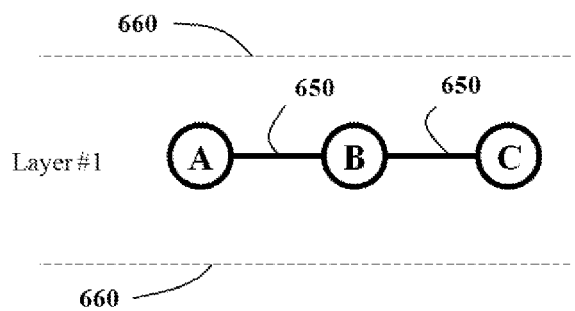
FIG. 29 illustrates a bubble diagram representing the attachment between the three individual 3D objects of a horizontal surface of a table.
FIG. 30 illustrates a table indicating the information of the bubble diagram of the horizontal surface represented in a different format.
FIG. 31 illustrates a first database defining the identity of individual 3D objects.
FIG. 32 illustrates a second database defining the attachment between the individual 3D objects.

FIG. 29 illustrates another bubble diagram representing the three prisms 240-260 of the horizontal surface of the table of FIG. 1, where the three prisms are respectively symbolized with the three English letters A, B, and C. The connection lines 650 indicate the attachments of the first prism with the second prism and the second prism with the third prism. The two layer lines 660 indicate having one layer only that all prisms are located in. FIG. 30 illustrates a table representing the information of the bubble diagram in a different format, whereas the English letter "H" in the table indicates a horizontal connection or attachment between the prisms based on their location in one layer. FIG. 31 illustrates a first database that identifies a horizontal surface of a food table by describing the axis pattern, the shape pattern, and the areas pattern of the individual 3D objects of the horizontal surface. As shown in the figure, the axis pattern is a "line", the shape pattern is a "polygon" and the area pattern is "any" which means there is no specific condition for the area pattern. FIG. 32 illustrates a second table indicating the possible number of individual 3D objects to form a horizontal surface of a table and the type of attachment between the individual 3D objects. Based on the first database and the second database of the previous two figures, the 3D model can be automatically recognized as a horizontal surface of a table.

Figures 33, 34:
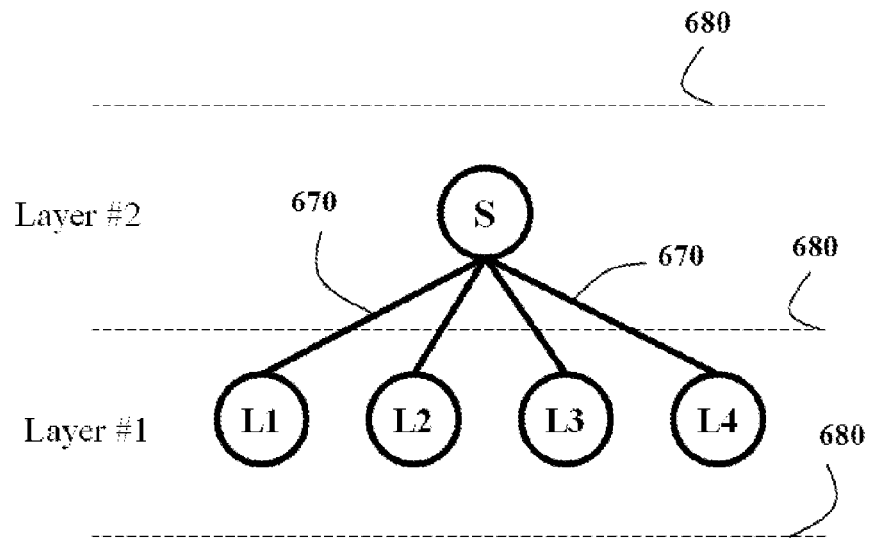
FIG. 33 illustrates a bubble diagram representing the attachment between the legs and the horizontal surface of the table.
FIG. 34 illustrates a table indicating the information of the bubble diagram of the table represented in a different format.

FIG. 33 illustrates a bubble diagram representing the attachment of the four legs and the horizontal surface of the 3D model of the table of FIG. 1. In this bubble diagram, the four legs are symbolized by L1, L2, L3, and L4, while the horizontal surface is symbolized with S. The connection lines 670 connect between each leg and the horizontal surface. The layer lines 680 indicate the location of the four legs in a first layer and the horizontal surface in a second layer, whereas the second layer is located above the first layer. FIG. 34 illustrates a table representing the same information of the bubble diagram but in a different format to enable recognizing the four legs and the horizontal surface as a table.

Figure 35:
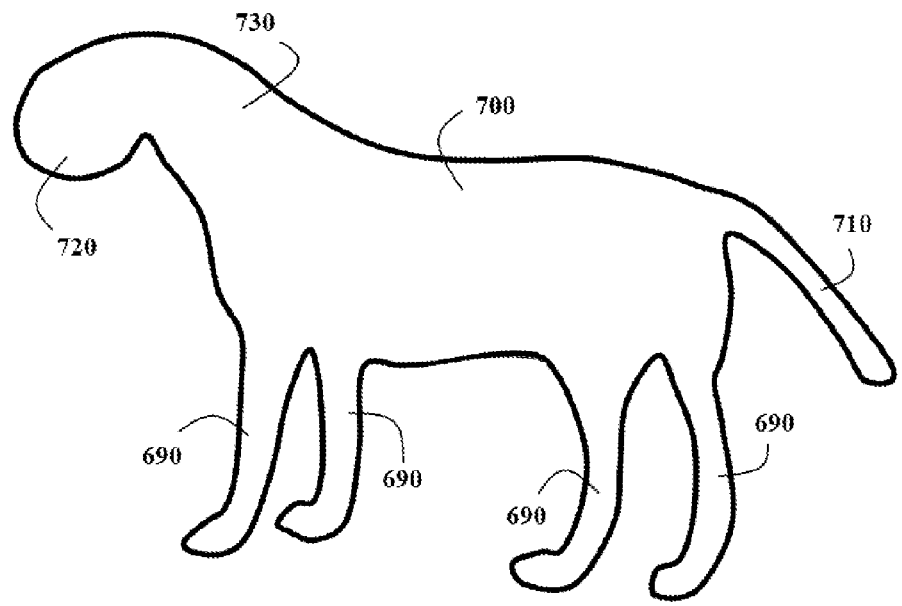
FIG. 35 illustrates a 3D model representing an animal with four legs, tail, body, neck and head.
Figure 36:
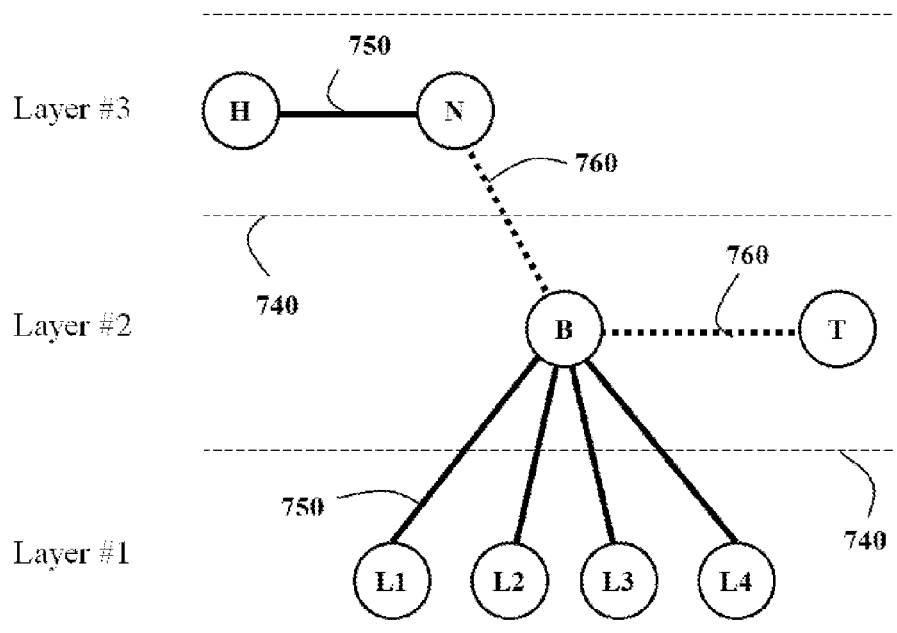
FIG. 36 illustrates a bubble diagram representing the attachment between the animal's legs, tail, body, neck and head.

FIG. 35 illustrates a 3D model of an animal comprised of four legs 690, tail 710, body 700, head 720 and a neck 730. The legs, tail, body, head and neck are respectively symbolized with the English letters L, T, B, H and N. FIG. 36 illustrates the bubble diagram representing the attachment relationship between the parts of the 3D model of the animal. The layer lines 740 indicate having three layers that are above each other. The connection lines 750 indicate the parts of the animal that have a fixed attachment, while the dotted connection lines 760 indicate the parts of the animal that can be rotated or moved from one layer to another. For example, both the tail and the neck can be located in the first layer, second layer, or third layer if they move. As was described previously, the information of the bubble diagram can be converted into a table containing the same information but in a different format to enable recognizing this 3D model as an animal.

Figure 37:
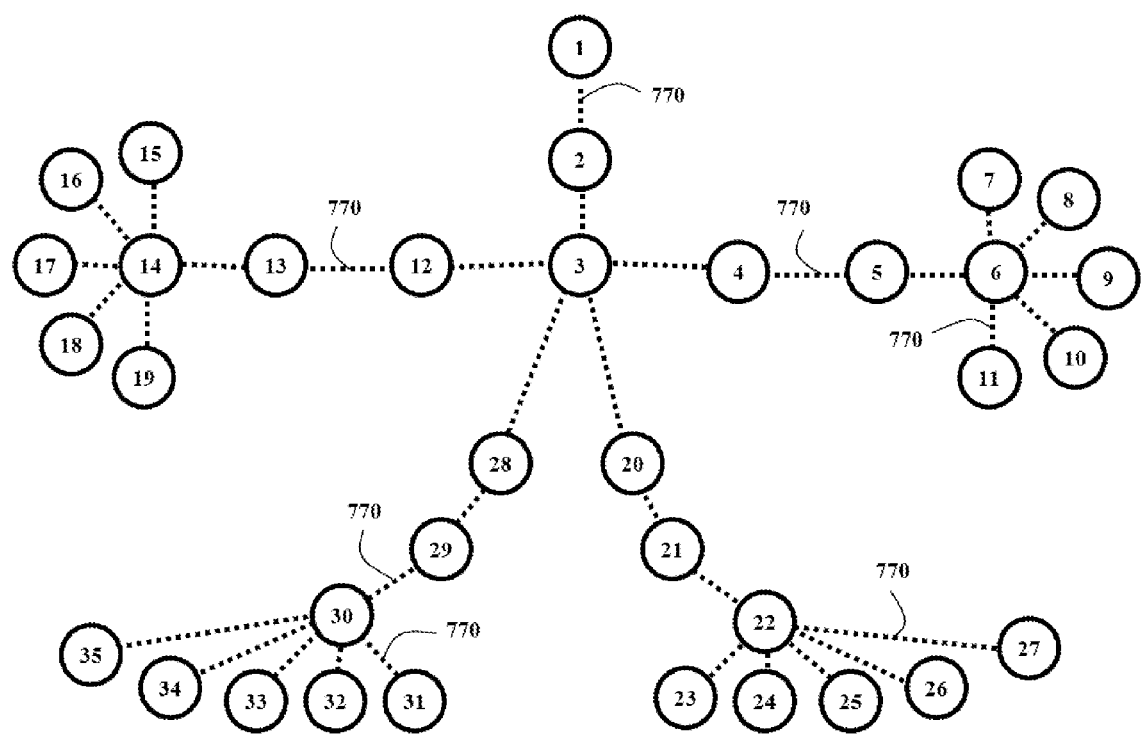
FIG. 37 illustrates a bubble diagram representing the parts of a 3D model of a human body.

FIG. 37 illustrates a bubble diagram representing a 3D model of a human body where each circle in the figure is assigned with a numeral representing a name of a part of the human body. FIG. 38 illustrates a table indicating the name of each part of the human body assigned to a numeral. The dotted connection lines 770 in FIG. 37 indicate that all parts of the human body can be moved from one layer to another due to the possible movement of each part of the human body. As was described previously, the information in this bubble diagram can be converted into a table containing the same information but in a different format to enable recognizing the 3D model as a human body.

The same method of using the bubble diagrams to represent the individual 3D objects that are attached to each other is also used with the individual 2D objects that are attached to each other. For example, FIG. 39 illustrates a combined 2D object in the form of an L-shape that can be divided into a first rectangle 780 and a second rectangle 790. FIG. 40 illustrates a bubble diagram representing the attachment between the first rectangle which is symbolized with "R1" and the second rectangle which is symbolized with "R2". The information in this bubble diagram can be converted into a table containing the same information but in a different format, as was described previously, to enable recognizing the 2D drawing as an L-shape.

Figure 41:
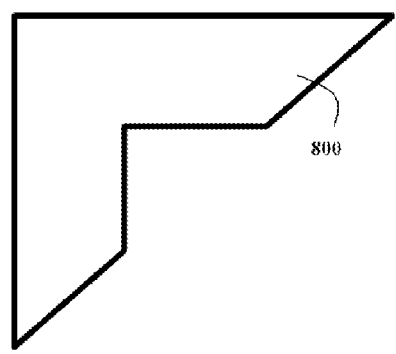
FIG. 41 illustrates an example of a combined 2D object that can be divided into a plurality of individual 2D objects.
Figure 42:
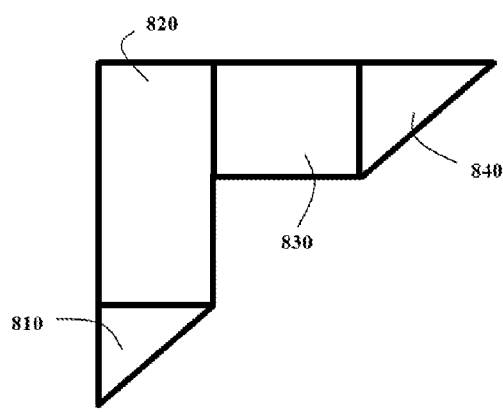
FIG. 42 illustrates dividing the combined 2D objects into a plurality of individual 2D objects.
Figure 43:
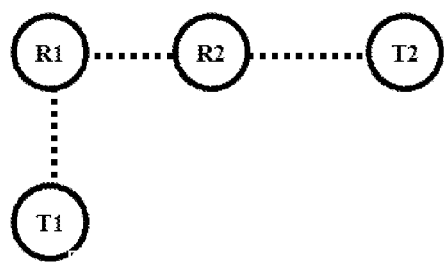
FIG. 43 illustrates a bubble diagram representing the attachment between the individual 2D object.

FIG. 41 illustrates an example of a combined 2D object 800 that can be divided into a plurality of individual 2D objects. FIG. 42 illustrates dividing the combined 2D objects into a first triangle 810, a first rectangle 820, a second rectangle 830 and a second triangle 840. FIG. 43 illustrates a bubble diagram representing the attachment between the first triangle, the first rectangle, the second rectangle and the second triangle that are successively symbolized by T1, R1, R2 and T2. The information of this bubble diagram can be converted into a table containing the same information but in a different format, as was described previously, to enable identifying the 2D drawing of FIG. 41 with a unique ID or name.

Generally, the 3D models described in the previous examples are represented according to a vector graphics format. However, in case of the 3D model it is represented by a set of points using the point cloud technique, in this case, a set of points that are converted into a plurality of triangles, as known in the art, where then the method of the present invention can be utilized with the triangles. Also if the 3D model is represented according to a raster graphics format, then an edge detection program is utilized to detect the edges of the 3D model and convert them into lines where each two lines that meet at one point are converted into a triangle. Accordingly, the 3D model can be recreated by a plurality of triangles where then the method of the present invention can be utilized with these triangles.

The invention claimed is:

1. A method for recognizing an individual 3D object represented by a 3D model according to a vector graphics format wherein the method comprising:
   slicing the individual 3D object into sections with a plurality of planes creating a number of 2D shapes;
   determining the axis pattern that describes a path connecting between the centers of the 2D shapes that are located on successive planes;
   determining the shapes pattern that describes the configuration of the 2D shapes;
   determining the areas pattern that describes the area variations between the 2D shapes; and
   checking the axis pattern, the shapes pattern, and the areas pattern against a database that associates each unique combination of an axis pattern, a shapes pattern, and an areas pattern with a unique ID identifying an individual 3D object.

2. The method of claim 1 wherein said plurality of planes are parallel to the xy-plane, xz-plane, or yz-plane.

3. The method of claim 1 wherein one or more of said 2D shapes are located on the same section.

4. The method of claim 1 wherein one or more of said axis pattern, said shape pattern, and said areas pattern are described by one or more words.

5. The method of claim 1 wherein one or more of said axis pattern, said shape pattern, and said areas pattern are described by one or more formulas or equations.

6. The method of claim 1 wherein said 3D object is 2D object, said 3D model is a 2D drawing, said planes are rays, said 2D shapes are lines, and said area variation is a length variation between said lines.

7. The method of claim 1 wherein said 3D model is originally represented according to a raster graphics format and converted into a 3D model represented according to a vector graphics format using an edge detection program.

8. The method of claim 1 wherein said 3D model is originally represented by a set of points using the point cloud technique and converted into a 3D model represented according to a vector graphics format.

9. The method of claim 6 wherein said rays are parallel to the x-axis, the y-axis, or the z-axis.

10. The method of claim 6 wherein one or more lines of said lines are located on one layer of said layers.

11. A method for recognizing a combined 3D object represented by a 3D model according to a vector graphics format wherein the combined 3D object is comprised of a plurality of individual 3D objects attached to each other and the method comprising:

for each individual object;
slicing the individual 3D object into sections with a plurality of planes creating a number of 2D shapes;
determining the axis pattern that describes a path connecting between the centers of the 2D shapes that are located on successive planes;
determining the shapes pattern that describes the configuration of the 2D shapes;
determining the areas pattern that describes the area variations between the 2D shapes; and
checking the axis pattern, the shapes pattern, and the areas pattern against a database that associates each unique combination of an axis pattern, a shapes pattern, and an areas pattern with a unique ID identifying an individual 3D object;
listing the IDs of the individual 3D objects;
describing the attachment relationship between the individual 3D object; and
checking the IDs of the individual 3D objects and the attachment relationship with a database that associates each unique combination of IDs of individual 3D objects and an attachment relationship of individual 3D objects with a unique ID identifying a combined 3D object.

12. The method of claim 11 wherein said attachment relationship is represented by a graphical representation illustrating the individual 3D objects that are attached to each other.

13. The method of claim 11 wherein said attachment relationship is represented by a table indicating the list of the individual 3D objects that are attached to each other.

14. The method of claim 11 wherein said attachment relationship is represented by a text indicating the list of the individual 3D objects that are attached to each other.

15. The method of claim 11 wherein said 3D model is originally represented according to a raster graphics format and converted into a 3D model represented according to a vector graphics format using an edge detection program.

16. The method of claim 11 wherein said 3D model is originally represented by a set of points using the point cloud technique and converted into a 3D model represented according to a vector graphics format.

17. The method of claim 11 wherein said combined 3D object is a combined 2D object,
said individual 3D objects are individual 2D objects, said 3D model is a 2D drawing,
said planes are rays, said 2D shapes are lines, and said area variation is a length variation between said lines.

18. The method of claim 17 wherein said rays are parallel to the x-axis, the y-axis, or the z-axis.

19. The method of claim 17 wherein one or more lines of said lines are located on one layer of said layers.

* * * * *